(12) United States Patent
Holstein et al.

(10) Patent No.: US 8,536,719 B2
(45) Date of Patent: Sep. 17, 2013

(54) TUBULAR TURBINE GENERATOR UNIT

(75) Inventors: Benjamin Holstein, Heidenheim (DE); Norman Perner, Neu-Ulm (DE); Hans Borrmann, Herbrechtingen (DE)

(73) Assignee: Voith Patent GmbH, Heidenheim (DE)

( * ) Notice: Subject to any disclaimer, the term of this patent is extended or adjusted under 35 U.S.C. 154(b) by 352 days.

(21) Appl. No.: 12/936,145

(22) PCT Filed: Apr. 3, 2009

(86) PCT No.: PCT/EP2009/002455
§ 371 (c)(1),
(2), (4) Date: Dec. 1, 2010

(87) PCT Pub. No.: WO2009/121612
PCT Pub. Date: Oct. 8, 2009

(65) Prior Publication Data
US 2011/0260458 A1 Oct. 27, 2011

(30) Foreign Application Priority Data
Apr. 3, 2008 (DE) .......................... 10 2008 017 537

(51) Int. Cl.
*F03B 13/00* (2006.01)
(52) U.S. Cl.
USPC ................................ 290/43; 290/52; 290/54
(58) Field of Classification Search
USPC ............................................. 290/43, 52, 54
See application file for complete search history.

(56) References Cited

U.S. PATENT DOCUMENTS

| | | | |
|---|---|---|---|
| 2,968,249 A | 1/1961 | Caine et al. | |
| 4,308,464 A | 12/1981 | Yamamoto | |
| 4,740,711 A | 4/1988 | Sato et al. | |
| 7,372,172 B2 * | 5/2008 | Winkler et al. | 290/43 |
| 7,385,303 B2 * | 6/2008 | Roos | 290/54 |
| 2008/0252077 A1 * | 10/2008 | Myers | 290/52 |

FOREIGN PATENT DOCUMENTS

| | | |
|---|---|---|
| AT | 403863 B | 10/1994 |
| CH | 389769 | 3/1965 |
| EP | 0131829 A1 | 1/1985 |
| EP | 1215393 A1 | 6/2002 |
| EP | 1 318 299 A1 * | 6/2003 |
| EP | 1878913 A1 | 1/2008 |

(Continued)

OTHER PUBLICATIONS

International Publication No. WO 2004/113717 A1, published Dec. 29, 2004, Application No. PCT/NO2004/000193 filed Jun. 25, 2004.

(Continued)

*Primary Examiner* — Tho D Ta
(74) *Attorney, Agent, or Firm* — Koppel, Patrick, Heybl & Philpott

(57) ABSTRACT

The invention concerns a tubular turbine generator unit including
  a turbine rotor disk;
  a drive shaft which is torsion-proof connected with the turbine rotor disk;
  an electrical generator with a generator rotor and a generator stator, wherein the generator rotor is driven at least via the drive shaft;
  a tubular turbine housing, which encloses the electrical generator;
  a bearing assembly, which is arranged inside the tubular turbine housing and enables to support the drive shaft;
characterized in that
  at least one floodable space is provided inside the tubular turbine housing, which is flooded with water in the region of the tubular turbine generator unit, wherein the generator gap between the generator rotor and the generator stator and the bearing gap of the bearing assembly are part of the floodable space.

15 Claims, 1 Drawing Sheet

(56) References Cited

FOREIGN PATENT DOCUMENTS

| | | |
|---|---|---|
| FR | 1022783 | 8/1950 |
| FR | 2209240 A1 | 11/1973 |
| GB | 2449436 A | 11/2008 |
| JP | 5316691 A | 11/1993 |
| JP | 6042443 A | 2/1994 |
| JP | 6-237554 * | 8/1994 |
| JP | 6237554 A | 8/1994 |
| JP | 10159701 A | 6/1998 |
| JP | 2002221141 A | 8/2002 |
| NL | 87583 C | 3/1958 |

OTHER PUBLICATIONS

International Publication No. WO 2007/147187 A1, published Dec. 27, 2007, Application No. PCT/AT2007/000300 filed Jun. 20, 2007.

* cited by examiner

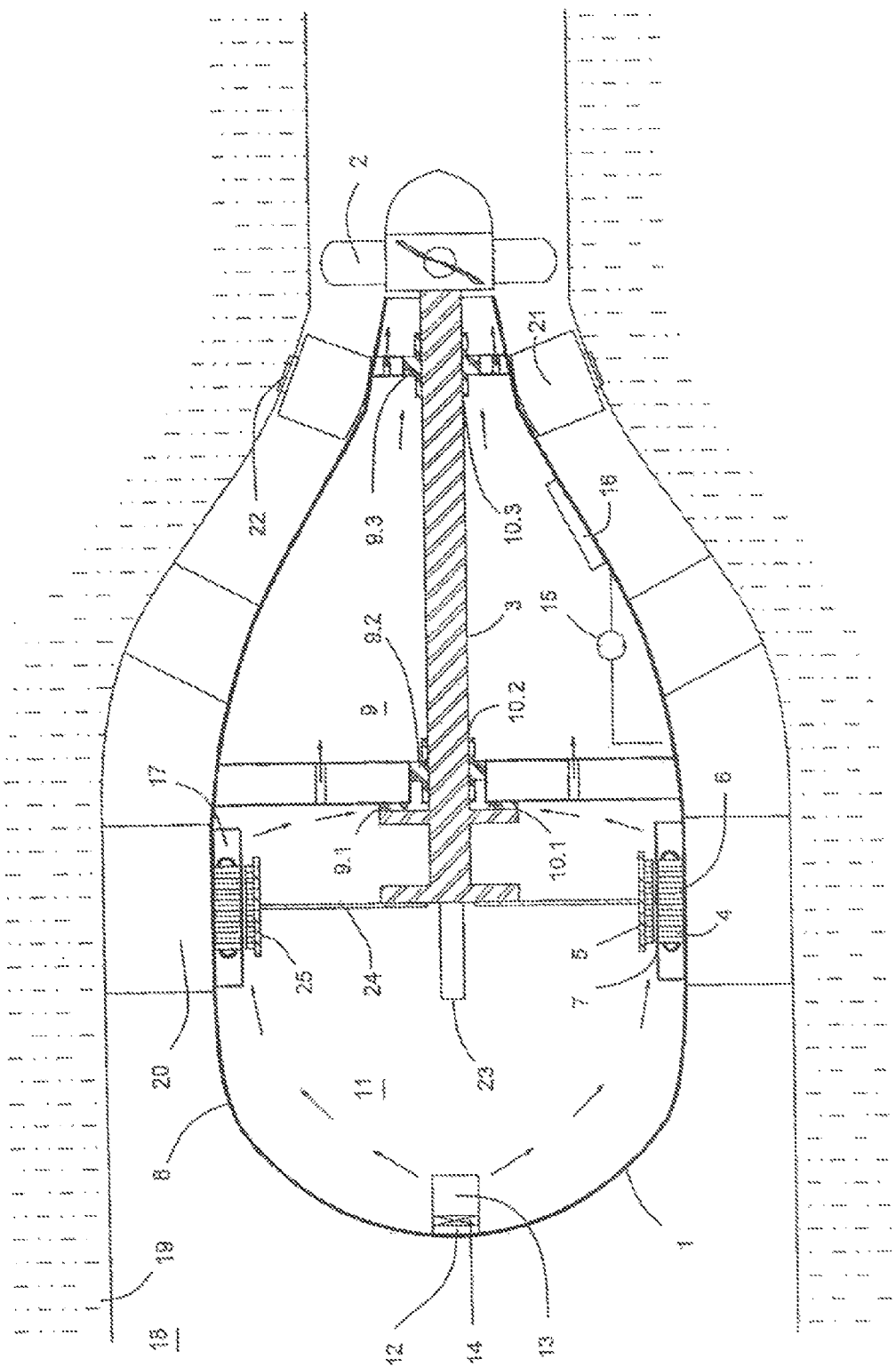

TUBULAR TURBINE GENERATOR UNIT

This is a National Stage Application of PCT/EP2009/002455 filed Apr. 3, 2009, published as WO 2009/121612 A3, and claiming priority from German application 10 2008 017 537.4 filed Apr. 3, 2008.

BACKGROUND OF THE INVENTION

1. Field of the Invention

The invention concerns a tubular turbine generator unit as well as power station facility, including such a tubular turbine generator unit in a flow channel.

2. Description of the Related Art

Tubular turbines are usually installed in flow channels of retaining dams and exhibit a typically pear-shaped tubular turbine housing close to the turbine rotor disk. Thus the tubular turbine housing accommodates an electrical generator, which is driven by the turbine rotor disk via a drive shaft. Moreover the tubular turbine housing enables to guide the flow and hence improves the incoming flow into the turbine rotor disk. Accordingly, the major section of the tubular turbine housing is arranged upstream of the turbine rotor disk. A generic tubular turbine generator unit is illustrated in document CH 389 769.

In addition to large-sized tubular turbine generator units, compact embodiments are also known which can be applied for instance for smaller power plant facilities, such as river water power stations or replace large-sized tubular turbine generator units in the form of matrix-shaped multiple configurations.

Larger tubular turbine generator units usually present an inlet opening to the inside of the tubular turbine housing for inspection and maintenance purposes, wherein access is normally provided through a hollow pillar or a separate pit, which connects the side surface of the flow channel and the tubular turbine housing. Maintenance tasks for which such access to the inside of tubular turbine housing is necessary are in particular intended for the bearings, usually with oil lubrication. An alternative with water lubricated bearings is divulged in document JP 2002221141 A2. Moreover the electrical generator as well as the components of the power electronics create such a waste heat that an additional cooling system is necessary. The components of the cooling system require there again a regular service.

The cooling system assigned to a tubular turbine generator unit requires quite an expensive construction. Corresponding realisations are known, using heat exchangers external to the tubular turbine housing—see for example document JP 6042443 A2. External cooling systems for the bearing oil have moreover been known since documents JP 53.16691 A2 and U.S. Pat. No. 4,308,464A. Besides, cooling facilities accommodated inside the tubular turbine housing are divulged in documents WO 07147187 A1. JP 6237554 A2 and AT 403863 B. To do so, system with air cooling or a combination of air and liquid cooling are used. It may be referred by way of example to documents NL 87 583 C and FR 2 209 240 C.

To dispense with additional constructive measures for cooling purposes document EP 1318299 A1 suggested to locate the components of the electrical generator close to the side surface inside the tubular turbine-housing by using a permanently excited rotor which is exclusively cooled via heat circulation to the outer skin of the tubular turbine housing and heat extraction by the surrounding water brushing past. This sets however particular requirements to the configuration of the electrical generator as regards material selection and expected performance, which restricts construction options and increases the production costs of the electrical generator.

Another difficulty with known tubular turbine generator units consists in sealing the inside of the tubular turbine housing against the surrounding water. The shaft seal is an essential component to prevent any water inflow from penetrating the drive shaft through the tubular turbine housing. This component requires expensive construction, increases mechanical friction and may create a source of contamination for the driving surrounding water by causing total loss lubrication.

If surrounding water inflow inside the tubular turbine housing cannot be completely excluded, draining respectively bilge systems prove necessary. See for instance document JP 10159701 A2. Mostly, these system must be fitted with oil separators, in case the bearings of the drive shaft are provided with an oil lubrication system.

SUMMARY OF THE INVENTION

The object of the invention is to provide a tubular turbine generator unit which remedies the problems described above. The tubular turbine generator unit must be characterised by long maintenance intervals. Preferably, the tubular turbine generator unit should be designed as substantially maintenance-free, so that access facility to the inside of the tubular turbine housing for regular inspection purposes can be dispensed with. Additionally, a power station facility should be provided for integrating such a maintenance free and easy-to-build tubular turbine generator unit.

The object mentioned above is satisfied by the characteristics of the independent claims. Advantageous embodiments are divulged in the sub-claims.

The invention concerns a floodable space inside the tubular turbine housing, which is flooded with water during the operation of the tubular turbine generator unit. A portion of this floodable space is the generator gap between the generator rotor and the generator stator of the electrical generator. Additionally, the bearing assembly for supporting the drive shaft between the turbine rotor disk and the electrical generator is water lubricated, so that the bearing gap of the bearing assembly is also part of the floodable space inside the tubular turbine housing.

As the tubular turbine housing is filled with liquid, the generator rotor is rotating in water which inevitably causes friction losses. Simultaneously, the inflow of water into the floodable space of the tubular turbine housing and in particular through the generator gap may cause efficient removal of the waste heat of the electrical generator. Consequently, no additional cooling system is necessary which enables saving on any corresponding energy consumption. Hereby, any loss caused by water friction of the generator rotor rotating in the liquid, in particular with respect to the rated power of the electrical generator can be relativised. Moreover, for typically large-sized tubular turbine generator units the generator rotor will rotate slowly so that the mentioned friction losses are on the whole negligible. In a preferred embodiment the floodable space is filled with liquid so that accordingly an inlet and an outlet are provided for the surrounding water on the tubular turbine housing.

Besides, the tubular turbine generator unit according to the invention presents additional advantages. On the one hand, the need for sealing the tubular turbine housing is minimal, in particular shaft seals on the drive shaft can be dispensed with. Accordingly, bilge systems for draining the tubular turbine housing are not required either.

Further, better service life of the tubular turbine generator unit according to the invention provides other advantages. This can be ascribed on the one hand to efficient cooling and on the other to the possibility of using more robust, water lubricated slide bearings instead of an oil lubricated bearing assembly for the drive shaft. The slide bearing pairs useable for that purpose are substantially wear-free. Moreover, said bearings are cooled efficiently as the bearing gap of the bearing assembly is filled with liquid.

The aforementioned improved accident prevention of the tubular turbine generator unit enables to dispense with facilities provided for regular inspections. Accordingly, it is not necessary to provide a dry connection for accessing the inside of the turbine housing. Consequently, the supporting struts for holding the tubular turbine generator unit inside the flow channel can be simplified and laid the flow channel for improved structural resistance and minimal blockage of the flow.

According to an advantageous embodiment of the tubular turbine generator unit a single inlet opening can be provided inside the tubular turbine housing which can be used in the unlikely event of failure. For that purpose, a repair procedure can take place after transitory drying up of the flow channel wherein a locking device can be installed for the flow channel. Alternately, a diver can be used to gain access to the inside of the tubular turbine housing via a sluice device as emergency access opening. In such a case, an embodiment is provided preferably, for which a pumping device is used for drying up the floodable space inside the tubular turbine housing, and creating a dry area in the tubular turbine housing for repair works.

Smaller tubular turbines may also be extracted from the flow channel and raised above the water surface using a crane system for repair.

BRIEF DESCRIPTION OF THE DRAWINGS

The invention will be described more in detail using an exemplary embodiment accompanied by an illustration. The following details are shown.

FIG. 1 shows an axial section of the tubular turbine generator unit configured according to the invention.

DETAILED DESCRIPTION OF THE INVENTION

FIG. 1 is a diagrammatical representation with the turbine rotor disk 2, the drive shaft 3, the electrical generator 4, including a generator rotor 5, a generator stator 6 and a generator gap 7 formed between these elements, as well as the tubular turbine housing 8 constituting the basic components of a tubular turbine generator unit 1.

According to the invention, a floodable space 11, filled with liquid during the operation of the tubular turbine generator unit 1, is provided inside the tubular turbine housing 8. Preferably, a liquid inlet 12 forms a fluid connection to the outside and hence to the surrounding water. A filtering device 13 is preferably provided to reduce the deposition of sediments in the floodable region 11.

Arrows intended to exemplify the direction of flow are provided on FIG. 1 to show the preferred flow inside the tubular turbine housing. It can be seen than the generator gap 7 is filled with liquid. Additionally, the supplied water reaches the components of the bearing assembly 9, wherein in particular the water supply line enters the bearing gap 10.1, 10.2 and 10.3. Moreover continuous openings are provided in the retaining structures to create sufficient circulation of the whole inside in the tubular turbine housing 8 in an advantageous embodiment. In the illustrated embodiment, the surrounding water fed through the tubular turbine housing 8 flows in the gap area between the tubular turbine housing 8 and the water turbine 2.

Additionally, the liquid inlet 12 is fitted with a closing device 14, which enables to empty the floodable space 11 in connection with the pumping device 15. This measure enables a service technician to climb in via the access opening 16 in case of emergency maintenance of the components of the tubular turbine generator unit 1. As represented, a simple access opening 16 is preferably selected, meant as emergency access and emerging into the surrounding water region. In other words, a dry passage from the side surface 19 of the flow channel 18 can be dispensed with. Accordingly, there is no additional flow obstacle and the tubular turbine generator unit 1 can be held by supporting struts 20 designed for easy liquid circulation inside the flow channel 18.

As the floodable space 11 is filled with water during the operation of the tubular turbine generator unit 1, the generator rotor 5 works inside the liquid. Accordingly, its outer sleeve is preferably designed to reduce friction losses in the water body as far as possible. For that purpose, a preferred embodiment is provided with a disk-shaped supporting element 24 and a supporting ring 25, wherein the latter supports the magnetic components of the generator rotor 5. Consequently, the electrical generator 4 can be in the form of a synchronous generator and the generator rotor 5 can include permanent magnets. Alternately or additionally, exciter windings and an exciter machine can be provided, wherein a contact-free transmission of the excitation power is preferred on the generator rotor 5 in case of external excitation. This arrangement will not be illustrated in details.

The floodable space and hence the water supply line in operation are situated inside the generator gap 7 between the generator rotor 6 and the generator stator 5. Accordingly, the electrical generator 4 should be encapsulated whereas preferably a watertight sealed space 17 is provided, for accommodating the electrical components of the electrical generator 4. To do so, a gap tube assembly can be provided, for encapsulating the components of the generator stator 6. Moreover, the sealed space 17 is filled preferably with a heat carrier medium, oil or ester, for enhancing thermal coupling.

In case of external excitation the components of the generator rotor 5 should be encapsulated accordingly. Consequently, a gap tube assembly may include a partition wall composed of an electrically non-conducting material. Alternately, the watertight sealed space 17 is sealed by casting compounds which are poured in for protecting the components to be encapsulated. Accordingly the components of the power electronics can be accommodated in the watertight sealed space 17, which may consist of several separate partial spaces.

Additionally, a bearing assembly 9 for supporting the drive shaft 3 is represented on the illustration. This includes a one-sided axial bearing 9.1, a first radial bearing 9.2 as well as a second radial bearing 9.3. The individual bearings of the bearing assembly 9 exhibit each a bearing gap 10.1, 10.2 and 10.3 which equips the floodable space 11 and filled with liquid in operation.

Consequently water-lubricated slide bearings can be used, which are fitted with a couple of hard and soft respectively elastic slide bearing material. Such an assembly is extremely robust and also impervious to penetrating sediments. The result is hence a bearing assembly 9, which is substantially maintenance-free. Moreover no special measures for cooling the bearings are needed since efficient heat extraction is ensured by flooding the bearing gaps 10.1, 10.2, 10.3.

Further, the illustration shows a turbine blade adjustment mechanism 23 arranged inside the tubular turbine housing 8. It acts via a hollow drive shaft 3 on the vanes of the turbine rotor disk 2 and adjusts its angle of attack with respect to the incoming flow. Additionally the illustration clearly shows a guide apparatus 21 which is arranged upstream of the turbine rotor disk 2 in the flow channel 18 of the power station facility.

To be able to dispense with further high-maintenance components inside the hardly accessible tubular turbine housing 8, the guide apparatus 22 dedicated adjustment device is housed in the side surface 19 of the flow channel for the illustrated preferred embodiment. An access pit can be provided to these elements (not represented). As further components of the power station facility, the tubular turbine generator unit 1 according to the invention can be fitted for instance with a flood gate for drying up the flow channel 18, although it is not shown on the illustration.

In an alternative embodiment of the invention it is also possible to fill the floodable space with water inside the tubular turbine housing not by letting surrounding water in but by using a filter water supply line. This process may for instance involve a supply connection to the side surface 19 of the flow channel. Such an embodiment is not represented in details on the illustration.

Further embodiments of the invention can be contemplated within departing from the framework of the appended protected claims.

LIST OF REFERENCE NUMERALS

1 Tubular turbine generator unit
2 Turbine rotor disk
3 Drive shaft
4 Electrical generator
5 Generator rotor
6 Generator stator
7 Generator gap
8 Tubular turbine housing
9 Bearing assembly
9.1 Axial bearing
9.2 First radial bearing
9.3 Second radial bearing
10.1 10.2, 10.3 Bearing gap
11 Floodable space
12 Liquid inlet
13 Filtering device
14 Closing device
15 Pumping device
16 Access opening
17 Watertight sealed space
18 Flow channel
19 Side surface of the flow channel
20 Supporting strut
21 Guide apparatus
22 Adjustment device of the guide apparatus
23 Turbine blade adjustment mechanism
24 Disk-shaped supporting element
25 Supporting ring

The invention claimed is:

1. A tubular turbine generator unit including:
   a turbine rotor disk;
   a drive shaft which is torsion-proof connected with the turbine rotor disk;
   an electrical generator with a generator rotor and a generator stator, wherein the generator rotor is driven at least via the drive shaft;
   a tubular turbine housing, which encloses the electrical generator;
   a bearing assembly, which is arranged inside the tubular turbine housing and enables to support the drive shaft;
   a floodable space inside the tubular turbine housing, which is flooded with water during operation of the tubular turbine generator unit, characterised in that
   the generator gap between the generator rotor and the generator stator and the bearing gap of the bearing assembly are part of the floodable space, wherein the water in said floodable space cools said electrical generator by removing waste heat.

2. A tubular turbine generator unit according to claim 1, characterised in that the tubular turbine housing comprises an inlet opening to the floodable space.

3. A tubular turbine generator unit according to claim 1, characterized in that the water in said floodable space lubricates said bearing assembly.

4. A tubular turbine generator unit including:
   a turbine rotor disk;
   a drive shaft which is torsion-proof connected with the turbine rotor disk;
   an electrical generator with a generator rotor and a generator stator, wherein the generator rotor is driven at least via the drive shaft;
   a tubular turbine housing, which encloses the electrical generator;
   a bearing assembly, which is arranged inside the tubular turbine housing and enables to support the drive shaft;
   a floodable space inside the tubular turbine housing, which is flooded with water during operation of the tubular turbine generator unit, characterised in that
   the generator gap between the generator rotor and the generator stator and the bearing gap of the bearing assembly are part of the floodable space, wherein the floodable space is in liquid connection with the surrounding water outside the tubular turbine housing a liquid inlet.

5. A tubular turbine generator unit according to claim 4, characterised in that the tubular turbine generator unit includes a filtering device for filtering the inflowing surrounding water at the liquid inlet.

6. A tubular turbine generator unit according to claim 4, characterised in that the liquid inlet includes a closing device for separating the floodable space from the surrounding water area.

7. A tubular turbine generator unit according to claim 6, characterised in that the tubular turbine generator unit includes a filtering device for filtering the inflowing surrounding water at the liquid inlet.

8. A tubular turbine generator unit according to claim 6, characterised in the tubular turbine generator unit includes a pumping device for drying up the floodable space.

9. A tubular turbine generator unit according to claim 8, characterised in that the tubular turbine generator unit includes a filtering device for filtering the inflowing surrounding water at the liquid inlet.

10. A tubular turbine generator unit including:
    a turbine rotor disk;
    a drive shaft which is torsion-proof connected with the turbine rotor disk;
    an electrical generator with a generator rotor and a generator stator, wherein the generator rotor is driven at least via the drive shaft;
    a tubular turbine housing, which encloses the electrical generator;
    a bearing assembly, which is arranged inside the tubular turbine housing and enables to support the drive shaft;

a floodable space inside the tubular turbine housing, which is flooded with water during operation of the tubular turbine generator unit, characterised in that the generator gap between the generator rotor and the generator stator and the bearing gap of the bearing assembly are part of the floodable space; and a watertight sealed space is arranged inside the tubular turbine housing for accommodating components of the generator rotor and/or of the generator stator and/or of the power electronics.

11. A tubular turbine generator unit according to claim 10, characterised in that the watertight sealed space includes a sealant in the form of a gap tube and/or of a casting compound.

12. A tubular turbine generator unit including:

a turbine rotor disk;

a drive shaft which is torsion-proof connected with the turbine rotor disk;

an electrical generator with a generator rotor and a generator stator, wherein the generator rotor is driven at least via the drive shaft;

a tubular turbine housing, which encloses the electrical generator;

a bearing assembly, which is arranged inside the tubular turbine housing and enables to support the drive shaft;

a floodable space inside the tubular turbine housing, which is flooded with water during operation of the tubular turbine generator unit, characterised in that the generator gap between the generator rotor and the generator stator and the bearing gap of the bearing assembly are part of the floodable space; and a component of a power station facility, including a flow channel with said tubular turbine generator unit arranged therein.

13. A turbine generator unit according to claim 12, wherein said power station facility is characterised in that a flood gate is arranged upstream of the tubular turbine generator unit for drying up the flow channel.

14. A turbine generator unit according to claim 12, wherein said power station facility is characterised in that the power station facility includes a guide apparatus, which equips the turbine rotor disk of the tubular turbine generator unit, wherein the guide apparatus presents an adjustment device arranged in a side surface of the flow channel.

15. A turbine generator unit according to claim 14, wherein said power station facility is characterised in that a flood gate is arranged upstream of the tubular turbine generator unit for drying up the flow channel.

* * * * *